(No Model.)
W. DELLINGER & J. G. McNAUGHTON.
MACHINE FOR GROOMING HORSES.
No. 392,788. Patented Nov. 13, 1888.
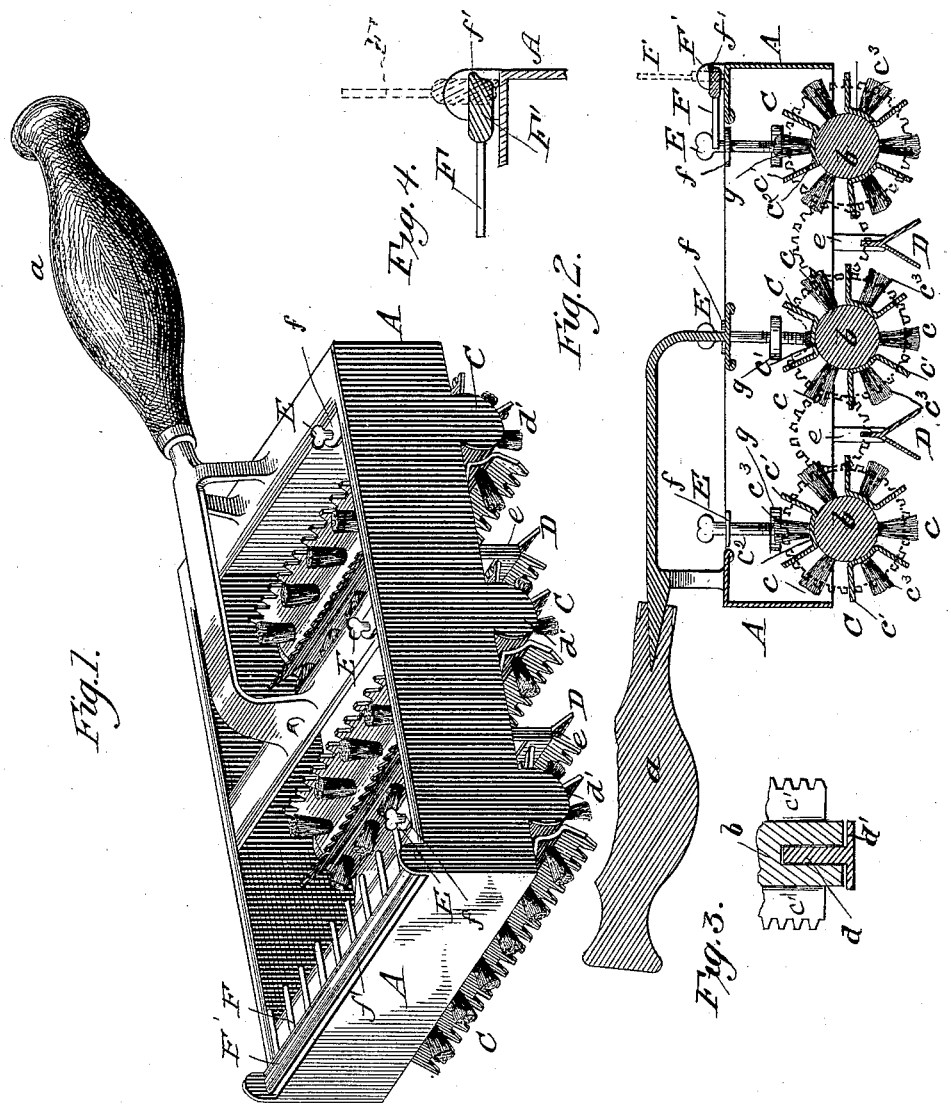
Witnesses.
Chas. H. Baker,
Albin M. Long.
Inventor:
William Dellinger.
John Grelis McNaughton.

UNITED STATES PATENT OFFICE.

WILLIAM DELLINGER AND JOHN GRELIS McNAUGHTON, OF MARION, NORTH CAROLINA.

MACHINE FOR GROOMING HORSES.

SPECIFICATION forming part of Letters Patent No. 392,788, dated November 13, 1888.

Application filed March 14, 1888. Serial No. 267,135. (No model.)

*To all whom it may concern:*

Be it known that we, WILLIAM DELLINGER and JOHN GRELIS McNAUGHTON, citizens of the United States, residing at Marion, in the county of McDowell and State of North Carolina, have invented a new and useful Improvement in Horse-Groomers, of which the following is a full, clear, and exact specification, reference being had to the accompanying drawings, in which—

Figure 1 is a perspective view of our horse-groomer. Fig. 2 is a sectional view thereof, and Fig. 3 is a detailed section thereof. Fig. 4 is a sectional view of the mane and tail comb.

This invention contemplates certain improvements in horse-groomers, having for its object to perform the joint functions of a curry-comb and brush, as also to serve as a tail and mane comb; and the invention consists of the combination of parts, including their construction, substantially as hereinafter fully set forth, and pointed out in the claims.

In carrying out our invention we provide a frame, A, having a handle, $a$, applied or fastened to the frame in any suitable way, both of which are of the usual curry-comb construction.

C C are a number of rotary combined brushes and curry-combs, and D D are a number of fixed or stationary combs which are applied to the frame A and alternate with each other at suitable or short intervals apart throughout the frame. The combined brushes and curry-combs consist each of a cylinder or roll, $b$, upon the periphery of which are disposed at short intervals apart alternate rows of brushes and combs $c\ c'$. The combs $c'$ themselves consist each of a continuous plate, $c^2$, which is formed with a base or central portion fitted and fastened to the roll or cylinder, and with flaring side portions having toothed or serrated longitudinal edges. In each comb $c'$ is also a row of brushes, $c^3$, being inserted therethrough into the roll. The rolls or cylinders $b$ are supported so as to have a rotary motion upon gudgeons $d$, projecting into sockets or recesses in the ends thereof and formed upon downwardly-projecting extensions $d'$ of the frame A. These rolls, if desired, may be provided with toothed or cogged disks at one end, to intergear with pinions suitably supported upon the frame A to assist their rotation.

The stationary or fixed combs D D are each preferably formed of a single piece folded or bent upon itself for a short distance in the plane of its transverse section, forming its back, and forked into two divergent side portions having toothed or serrated lower longitudinal edges.

The combs D D are secured at the ends of their upper folded portions between the bifurcated inwardly-projecting ends of pendants or arms $e\ e$, the upper ends of which are secured to the frame A.

E E are tension-screws working in screw-threaded apertures of studs or projections $f$, projecting from the inner side of the frame A. The screws E are provided at their upper ends with thumb-nut-shaped heads and passed through apertured plates $g$, also projecting from the inner side of the frame A, while their lower ends are adapted to bear upon the rolls or cylinders $b$.

It will be seen that by screwing or working the screws E E so as to vary the pressure upon the cylinders or rolls $b\ b$ the rotation of the same can be varied according to the amount of resistance it is desired to impart to the same, thus regulating the frictional action or pressure of the rotary brushes and combs.

F is the tail and mane comb, consisting of a "head" or bar, F', provided with a series of properly-spaced-apart teeth and let into ears or apertured plates upon the sides of the frame A at one end thereof, so as to allow the comb to be turned down or stood up when used. At one side of its axial point the head or bar F' is provided with a stop, $f'$, to limit the upward movement of and arrest the comb when it has reached a vertical position, and thus hold it against displacement while in use.

In operation it will be seen that while the stationary teeth, as also the teeth of the rotary combs, will lift or raise the hair of the horse or animal as the groomer is passed over the same, exposing the dust or dirt, this action of the teeth will be supplemented or followed up by the action of the brushes, removing the dust or dirt, thus effectually performing the operation of currying or combing and brushing the animal.

Having thus fully described our invention, what we claim, and desire to secure by Letters Patent, is—

1. The groomer provided with stationary or fixed combs, each consisting of a continuous plate folded or bent upon itself, forming the back, and having divergent portions or sides provided with serrated or toothed lower longitudinal edges, substantially as set forth.

2. The groomer provided with rotary brushes, each comprising a roll or cylinder provided with alternating brushes and combs, the latter having a row of brushes arranged between its side toothed or serrated plates, substantially as set forth.

3. The groomer provided with alternating rotary combined brushes and combs and fixed or stationary combs, which combined brushes and combs each consist of series of alternating rows of brushes and combs, and which stationary or fixed combs each consist of a continuous plate bent or folded upon itself, and having divergent side plates provided with serrated or toothed lower longitudinal edges, substantially as set forth.

4. The groomer provided with rotary combined brushes and combs and with screws for regulating the rotation of said brushes and combs, substantially as set forth.

5. The groomer provided with rotary combined brushes and combs having their rolls or cylinders journaled in the supporting-frame, and thumb-screws working in projections or studs upon the said frame and bearing upon the said rolls or cylinders, substantially as specified.

6. The groomer provided with rotary brushes, each comprising a roll or cylinder provided with alternating brushes and combs, substantially as set forth.

7. The groomer provided upon one side with rotary brushes, each comprising a roll or cylinder provided with alternating brushes and combs, while upon the other side it is provided with a mane and tail comb, substantially as set forth.

WILLIAM DELLINGER.
JOHN GRELIS McNAUGHTON.

Witnesses:
WILLIAM McCURRY,
WILLIAM FLETCHER CRAIG.